Jan. 28, 1958 W. A. WHITE 2,821,335
HUNTER'S IMPLEMENT
Filed July 12, 1954 2 Sheets-Sheet 1
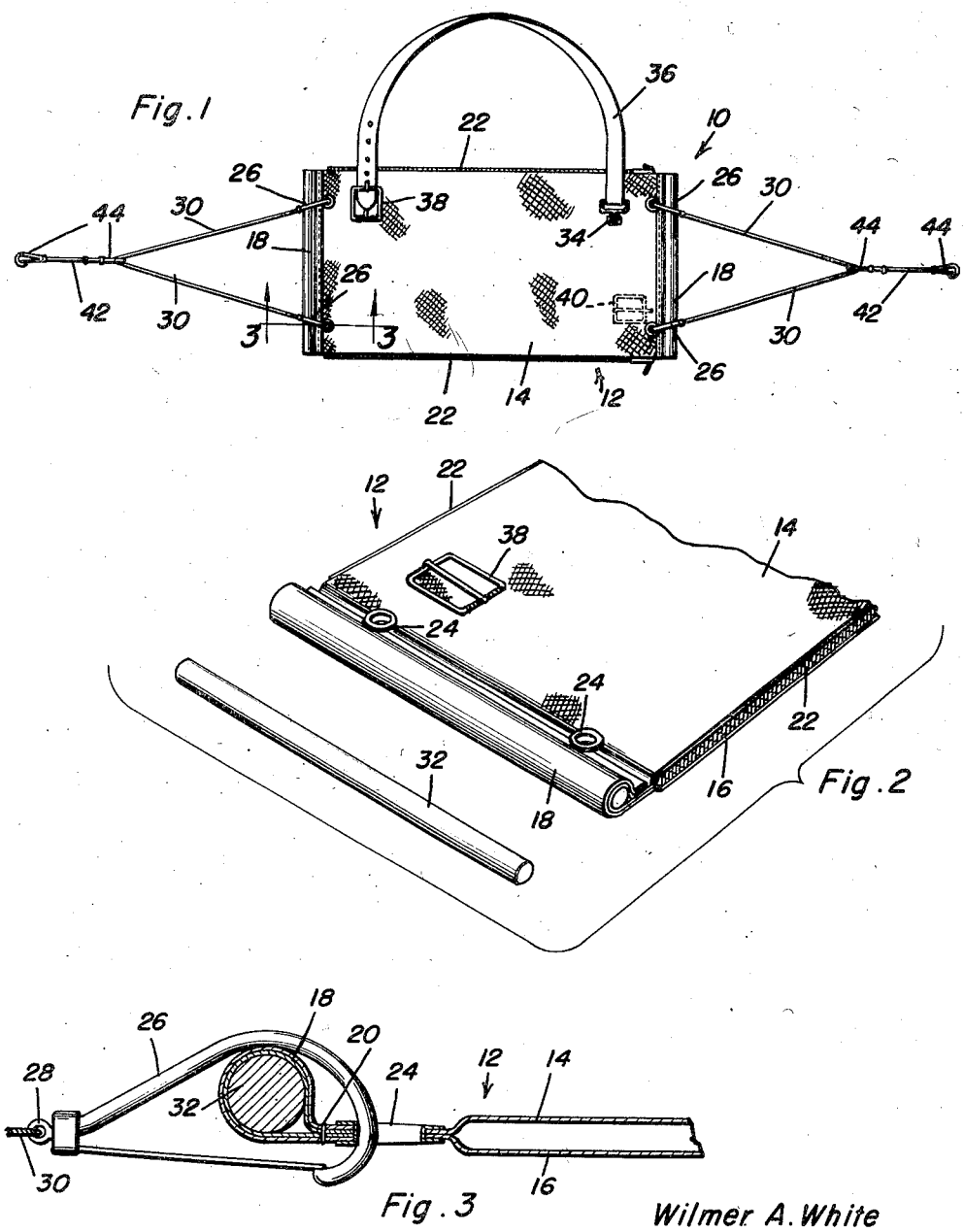
Wilmer A. White
INVENTOR.

Jan. 28, 1958  W. A. WHITE  2,821,335
HUNTER'S IMPLEMENT
Filed July 12, 1954  2 Sheets-Sheet 2
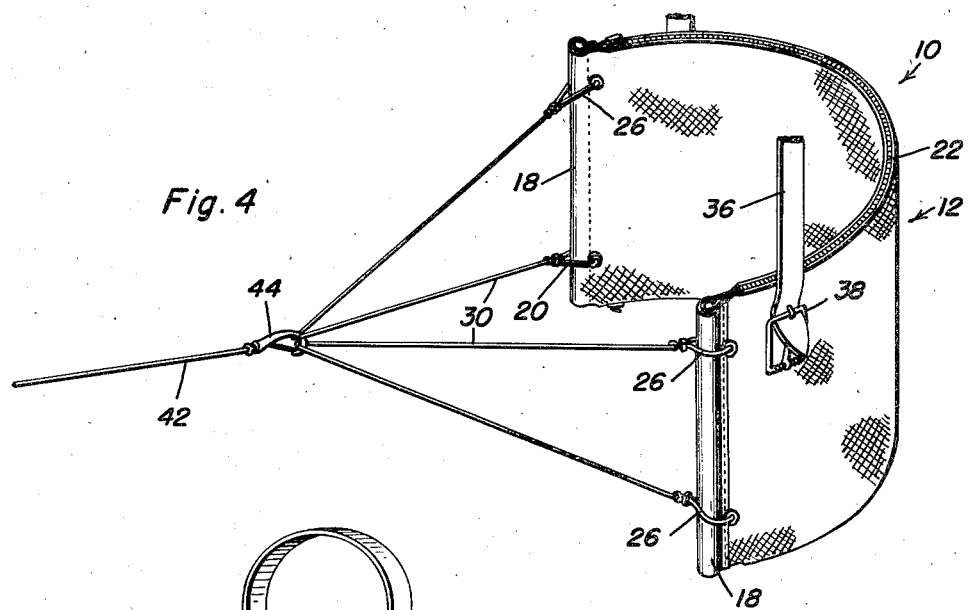
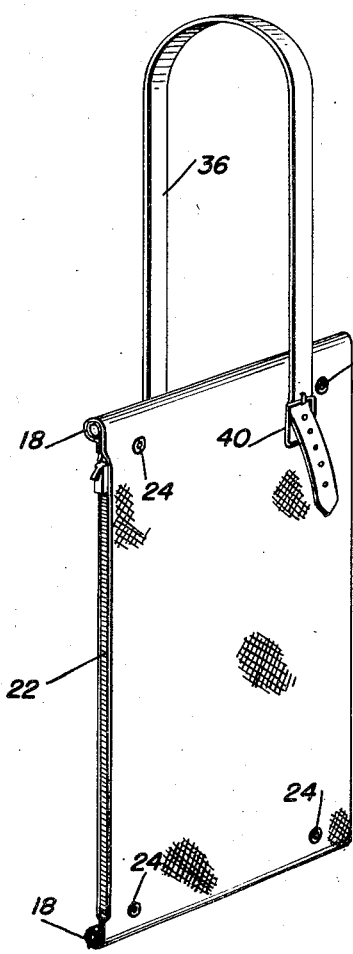
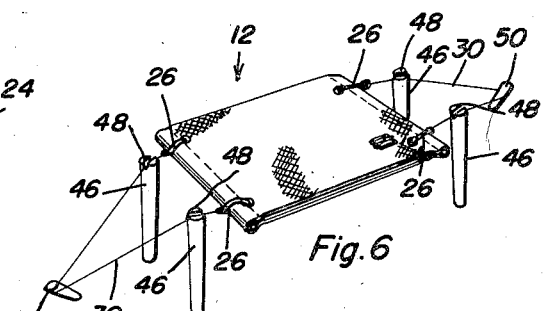
Wilmer A. White
INVENTOR.

United States Patent Office 2,821,335
Patented Jan. 28, 1958

2,821,335

HUNTER'S IMPLEMENT

Wilmer A. White, Parkesburg, Pa., assignor of one-half to Barrie L. White, Parkesburg, Pa.

Application July 12, 1954, Serial No. 442,809

5 Claims. (Cl. 224—46)

This invention relates in general to improvements in sportsmen's accessories, and more specifically to an improved hunter's implement.

The primary object of this invention is to provide an improved hunter's implement which includes a convertible member which may be utilized in forming a seat, as a game receptacle or as a support member for a game tow line.

Another object of this invention is to provide an improved hunter's implement which includes a convertible member which may be converted for use as a seat between trees or as a seat supported by stakes.

Another object of this invention is to provide a hunter's implement in the form of a bag-like convertible member which may be utilized as a game bag, the convertible member being transformable into a body-fitting attachment for a tow line for heavy game.

A further object of this invention is to provide an improved hunter's implement which may be converted for a plurality of uses by a hunter, the implement being self-contained.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a plan view of the hunter's implement which is the subject of this invention and shows the same disposed for attachment between a pair of trees to form a suspended seat;

Figure 2 is an enlarged fragmentary exploded perspective view of an end portion of the hunter's implement of Figure 1 and shows the general details thereof;

Figure 3 is an enlarged fragmentary vertical sectional view taken substantially upon the plane indicated by the section line 3—3 of Figure 1 and shows the construction of one end of a convertible member forming a major part of the hunter's implement and the connection of a flexible connector thereto;

Figure 4 shows the hunter's implement of Figure 1 converted for use as a heavy game tow;

Figure 5 is an enlarged perspective view of the hunter's implement of Figure 1 converted for use as a game bag; and Figure 6 is a perspective view on a reduced scale of the hunter's implement of Figure 1 and shows the same utilized as a stake-supported seat.

Referring now to the drawings in detail, it will be seen that the hunter's implement which is the subject of this invention is referred to in general by the reference numeral 10. The hunter's implement 10 includes a bag-like, convertible member which is referred to in general by the reference numeral 12. The convertible member 12 is formed by a first layer 14 which is disposed substantially in face-to-face engagement with a second layer 16. The layers 14 and 16 are in overlying relation and have their ends rolled to form a rolled tubular hem 18. The ends of the layers 14 and 16 are secured together by stitching 20, as is best illustrated in Figure 3. The side edges of the layers 14 and 16 are connected together by slide fasteners 22.

Carried by each end portion of the convertible member 12 is a pair of transversely spaced eyelets 24. The eyelets 24 extend through the layers 14 and 16 and have removably passed therethrough portions of snap fasteners 26, as is best illustrated in Figure 3. Each snap fastener 26 includes an eye 28 in which is received one end of a flexible connector 30, there being a flexible connecter 30 at each end of the convertible member 12.

In order that the convertible member 12 may be stiffened in a transverse direction, there is provided a reinforcing rod 32. The reinforcing rod 32 is disposed in the rolled hem 18, as is best illustrated in Figure 3 to reinforce the hem. The reinforcing rod 32 is preferably formed of a light weight material such as aluminum or magnesium so as to reduce the weight of the hunter's implement.

Carried by the layer 14 adjacent one corner thereof is a swivel 34. Connected to the swivel 34 is one end of a strap 36.

Carried by a longitudinally spaced corner of the layer 14 is a buckle 38. The buckle 38 is directed toward an adjacent side edge of the layer 14 and has selectively adjustably connected thereto the opposite end of the strap 36.

For reference purposes, the buckle 38 may be considered a first buckle. A second buckle 40 is carried by the layer 16 at a corner thereof disposed transversely from the swivel 34. The strap 36 may be pivoted from the position illustrated in Figure 1 so as to have its free end connected to the buckle 40 in the manner illustrated in Figure 5 for a reason to be set forth in more detail hereinafter.

The hunter's implement 10 also includes a pair of elongated lines 42. Each of the lines 42 is provided at its opposite end with snap fasteners 44.

Referring now to Figure 1 in particular, it will be seen that the hunter's implement 10 is positioned to form an elevated seat. In order that the hunter's implement 10 may be formed in an elevated seat, the lines 42 are connected to the central portions of the flexible connectors 30 by the snap fasteners 44 at first ends thereof. The snap fasteners 44 at the opposite ends of the lines 42 are selectively engageable around trees or posts (not shown) which are disposed in spaced relation so that the convertible member 12 may be suspended between the trees or posts and form a seat.

Referring now to Figure 6 in particular, it will be seen that there is illustrated a modified form of seat construction formed with only a portion of the hunter's implement 10. The strap 36 has been removed from the convertible member 12 by disengaging the pivotal connection or swivel 34 and the lines 42 have been removed. Legs or short posts 46 has been driven into the ground in rectangular arrangement. Each of the posts 46 is provided at its upper end with a notch 48. The posts 46 are so arranged whereby they will be generally aligned with the eyelets 24 and be disposed adjacent the ends of the convertible member 12. Intermediate portions of the flexible connectors 30 are then passed through the notches 48 and the flexible connectors 30 tensioned by driving stakes 50 into the ground. The stakes 50 engage the central portion of the flexible connectors 30 to tension them. When the flexible connectors 30 are properly tensioned, the convertible member 12 will be tensioned and form a seat.

Referring now to Figure 5 in particular, it will be seen that a portion of the hunter's implement 10 has been arranged to form a game bag. The convertible member 12 forms the bag and access to the interior thereof is obtained through one of the slide fasteners 22. The convertible member 12 is arranged for mounting over a hunter's shoulder by connecting the strap 36 to the second buckle 40. This arranges the strap 36 for the supporting of the convertible member 12 in a vertical position. If utilized on a hunting trip, the flexible connectors 30 and the lines 42 may be stored for future use within the convertible member 12.

Referring now to Figure 4 in particular, it will be seen that the hunter's implement 10 has now been converted to form a drag or tow for large animals, such as deer. When it is intended to be utilized as a drag, the strap 36 of the hunter's implement 10 is connected to the first buckle 38. Further, the flexible connectors 30 have their central portions engaged by a snap fastener 44 of one of the lines 42. In order that a drag line of sufficient length may be prepared, if desired, the two lines 42 may be connected together (not shown).

When the parts of the hunter's implement 10 are so arranged, the strap 36 is arranged around the back of a hunter's neck and the convertible member 12 is disposed across the chest of the hunter. Further, the flexible connectors 30 pass around the sides of the hunter and converge rearwardly of him. When the hunter's implement 10 is so disposed, sufficient pressure may be applied on the convertible member 12 to pull a deer or other heavy game out of the woods.

From the foregoing description of the hunter's implement which is the subject of this invention, it will be seen that there has been devised a sportsman's accessory which is extremely light in weight and while it is formed of a number of parts, it is so constructed whereby the parts now being used may be conveniently stored. Further, it will be seen that the implement is easily adapted to numerous uses.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A collapsible seat comprising a convertible member including first and second layers, said first and second layers being disposed in face-to-face relation, ends of said layers being secured together by rolled hems, a pair of transversely spaced eyelets in each end portion of said layers for receiving snap fasteners, a snap fastener received in each eyelet, a flexible connector having opposed ends connected to snap fasteners of each pair of snap fasteners, a pair of posts disposed adjacent each end of said convertible member, said posts having notched upper ends receiving intermediate portions of said flexible connectors, stakes engaging central portions of said flexible connectors to tension said flexible connectors.

2. A deer pull comprising a convertible member including first and second layers, said first and second layers being disposed in face-to-face relation, ends of said layers being secured together by rolled hems, said edges of said layers being connected together, said layers having end portions, a pair of transversely spaced eyelets in each end portion of said layers for receiving snap fasteners, a snap fastener received in each eyelet, said fasteners being arranged in pairs, a flexible connector having opposed ends connected to snap fasteners of each pair of snap fasteners, a tow line connected at one end to central portions of said flexible connectors, a strap releasably carried by a side edge portion of the convertible member, said strap being receivable about a hunter's neck to retain said convertible member in engagement with a hunter's chest.

3. A sportsman's accessory comprising a convertible generally rectangular flexible member having rolled hems at opposite ends thereof, reinforcing rods carried in said hems, said flexible member having end portions, a pair of transversely spaced eyelets in each end portion of said convertible member, a pair of snap fasteners at each end of said convertible member, said snap fasteners passing around said hems and said reinforcing rods with portions thereof passing through said eyelets, flexible connectors at each end of said convertible member, each flexible connector having opposite ends connected to snap fasteners of an adjacent pair of said snap fasteners, and load sustaining means connected to central portions of said flexible connectors.

4. A collapsible seat comprising a convertible generally rectangular flexible member having rolled hems at opposite ends thereof, reinforcing rods carried in said hems, a pair of transversely spaced eyelets in each end portion of said convertible member, a pair of snap fasteners at each end of said convertible member, said snap fasteners passing around said hems and said reinforcing rods with portions thereof passing through said eyelets, flexible connectors at each end of said convertible member, each flexible connector having opposite ends connected to snap fasteners of an adjacent pair of said snap fasteners, a line connected at one end to a central portion of each flexible connector, the other end of each line having fastening means for attaching to a standard.

5. A deer pull comprising a convertible generally rectangular flexible member having rolled hems at opposite ends thereof, reinforcing rods carried in said hems, said flexible member having end portions, a pair of transversely spaced eyelets in each end portion of said convertible member, a pair of snap fasteners at each end of said convertible member, said snap fasteners passing around said hems and said reinforcing rods with portions thereof passing through said eyelets, flexible connectors at each end of said convertible member, each flexible connector having opposite ends connected to snap fasteners of an adjacent pair of said snap fasteners, a tow line connected at one end to central portions of said flexible connectors.

References Cited in the file of this patent

UNITED STATES PATENTS

| 423,380 | Fry | Mar. 11, 1890 |
| 615,907 | Richey | Dec. 13, 1898 |
| 1,520,589 | Matkovic | Dec. 23, 1924 |
| 2,385,458 | Naon | Sept. 25, 1945 |
| 2,544,493 | Filenbaum | Mar. 6, 1951 |
| 2,592,771 | Wampler | Apr. 15, 1952 |
| 2,675,150 | Ackerman | Apr. 13, 1954 |
| 2,691,400 | Giordano | Oct. 12, 1954 |

FOREIGN PATENTS

| 251,850 | Great Britain | May 13, 1926 |